(12) United States Patent
Qiu et al.

(10) Patent No.: US 10,542,276 B2
(45) Date of Patent: Jan. 21, 2020

(54) DATA CACHING METHOD AND APPARATUS FOR VIDEO DECODER

(71) Applicants: MONTAGE LZ SEMICONDUCTOR (SHANGHAI) CO., LTD., Shanghai (CN); MONTAGE LZ TECHNOLOGIES (CHENGDU) CO., LTD., Shuangliu District, Chengdu OT (CN)

(72) Inventors: Zhimin Qiu, Shanghai (CN); Huanxin Wang, Shanghai (CN)

(73) Assignees: MONTAGE LZ SEMICONDUCTOR (SHANGHAI) CO., LTD., Shanghai (CN); MONTAGE LZ TECHNOLOGIES (CHENDU) CO., LTD., Chengdu (CN)

( * ) Notice: Subject to any disclaimer, the term of this patent is extended or adjusted under 35 U.S.C. 154(b) by 171 days.

(21) Appl. No.: 15/393,266

(22) Filed: Dec. 29, 2016

(65) Prior Publication Data

US 2018/0084269 A1  Mar. 22, 2018

(30) Foreign Application Priority Data

Sep. 20, 2016 (CN) ............................ 2016 1 0835486

(51) Int. Cl.
*H04N 19/51* (2014.01)
*H04N 19/44* (2014.01)
(Continued)

(52) U.S. Cl.
CPC ......... *H04N 19/51* (2014.11); *H04L 67/2842* (2013.01); *H04N 19/176* (2014.11);
(Continued)

(58) Field of Classification Search
CPC .... H04N 19/433; H04N 19/176; H04N 19/51; H04N 19/61; H04N 19/423; H04N 19/43;
(Continued)

(56) References Cited

U.S. PATENT DOCUMENTS

2004/0264565 A1* 12/2004 MacInnis ............. H04N 19/433
375/240.01
2016/0065973 A1* 3/2016 Cote ..................... G06F 12/121
375/240.16
(Continued)

FOREIGN PATENT DOCUMENTS

CN 101189573 A 5/2008
CN 101232464 A 7/2008
(Continued)

OTHER PUBLICATIONS

The First Office Action in Chinese Patent Application No. 201610835486.X, dated May 29, 2019.

*Primary Examiner* — Dramos Kalapodas
*Assistant Examiner* — Samuel D Fereja
(74) *Attorney, Agent, or Firm* — Jun He Law Offices P.C.; James J. Zhu

(57) ABSTRACT

A data caching method for a video decoder includes: receiving a data request from the video decoder, wherein the data request is for requesting one or more reference pixel blocks to decode a present pixel block, and the data request contains one or more reference motion vectors each corresponding to a reference pixel block; determining, for each reference motion vector in the data request, whether the reference pixel block corresponding to the reference motion vector has been cached in a cache memory which caches a plurality of reference pixel blocks; and if the reference pixel block corresponding to the reference motion vector has not been cached in the cache memory: A) determining an expected usage number and a historical usage condition for each
(Continued)

reference pixel block which has been cached in the cache memory, wherein the expected usage number indicates how many times the cached reference pixel block will be used in decoding of a predetermined number of subsequent pixel blocks after the present pixel block, and the historical usage condition indicates a least recently used record of the cached reference pixel block; and B) selecting and deleting one of the cached reference pixel blocks according to the expected usage numbers and historical usage conditions of the cached reference pixel blocks, caching a reference pixel block corresponding to the reference motion vector from an external memory into the cache memory, and providing the reference pixel block to the video decoder.

10 Claims, 13 Drawing Sheets

(51) Int. Cl.
*H04N 19/423* (2014.01)
*H04N 19/176* (2014.01)
*H04N 19/182* (2014.01)
*H04L 29/08* (2006.01)

(52) U.S. Cl.
CPC ......... *H04N 19/182* (2014.11); *H04N 19/423* (2014.11); *H04N 19/44* (2014.11)

(58) Field of Classification Search
CPC .... H04N 19/44; H04N 19/172; H04N 19/105; H04N 19/523; H04N 19/52; H04N 19/117; H04N 19/137; H04N 19/156; H04N 19/14; H04N 19/107; H04N 19/119; H04N 19/147; H04N 19/182; H04N 19/436; H04N 19/53; H04N 19/533; H04N 19/573; H04N 19/82; H04N 19/132; H04N 19/159; H04N 19/174; H04N 19/192; H04N 19/463; H04N 19/593; H04N 19/103; H04N 19/13; H04N 19/136; H04N 19/154; H04N 19/186; H04N 19/40; H04N 19/46; H04N 19/563; H04N 19/94; H04N 5/145; H04N 19/115; H04N 19/139; H04N 19/503; H04N 19/56; H04N 19/70; H04N 19/91; H04N 11/02; H04N 19/102; H04N 19/114; H04N 19/124; H04N 19/127; H04N 19/129; H04N 19/142; H04N 19/146; H04N 19/149; H04N 19/152; H04N 19/164; H04N 19/17; H04N 19/177; H04N 19/197; H04N 19/198; H04N 19/20; H04N 19/42; H04N 19/439; H04N 19/513; H04N 19/517; H04N 19/58; H04N 19/62; H04N 19/67; H04N 19/85; H04N 19/86; H04N 7/12; H04N 19/00; H04N 19/00587; H04N 19/0066; H04N 19/10; H04N 19/109; H04N 19/15; H04N 19/16

See application file for complete search history.

(56) References Cited

U.S. PATENT DOCUMENTS

| | | | |
|---|---|---|---|
| 2017/0006303 A1* | 1/2017 | Sethuraman | H04N 19/179 |
| 2017/0150159 A1* | 5/2017 | Lee | H04N 19/423 |
| 2018/0103260 A1* | 4/2018 | Chuang | H04N 19/423 |

FOREIGN PATENT DOCUMENTS

| | | |
|---|---|---|
| CN | 102246522 A | 11/2011 |
| CN | 102340622 A | 2/2012 |
| TW | 201620306 A | 6/2016 |

* cited by examiner

DATA CACHING METHOD AND APPARATUS FOR VIDEO DECODER

CROSS REFERENCE TO RELATED APPLICATIONS

This application claims priority to Chinese Patent Application Number 201610835486.X filed on Sep. 20, 2016, the entire content of which is incorporated herein by reference.

BACKGROUND OF THE INVENTION

1. Technical Field

The application generally relates to computer technology, and more particular to a data caching method and a data caching apparatus for a video decoder.

2. Related Art

With the development of image and video processing technology, more and more electronic devices are integrated with image and video processing devices. These electronic devices can receive and process video data using the image and video processing devices, so as to convert the video data into playable video pictures.

For purpose of transmission and storage, the video data is usually compressed in accordance with a predetermined coding standard, such as the MPEG-2 standard, etc. These coding standards usually use motion compensation technology. Specifically, in motion compensation, the video encoder or video decoder may use one or more reference pictures to reconstruct a portion of the picture to be processed, wherein the reference pictures may be pictures which have been decoded (for the video decoder), or pictures which have been reconstructed (for the video encoder). The reference pictures are usually stored in a local memory of the electronic device.

For a video decoder, in order to improve video decoding efficiency and reduce access to the local memory, a video data cache is used to cache data obtained from the local memory during the decoding process, and the cached data is provided to the video decoder according to a request from the video decoder. As the capacity of the video data cache is limited, video data cached therein needs to be updated in the entire decoding process. However, the conventional method for updating the video data cache is low in efficiency, which lowers video decoding efficiency and increases requirements on access to the local memory and system bandwidth for video decoding.

SUMMARY

An objective of the present application is to provide a data caching method and a data caching apparatus for a video decoder, which is capable of improving the video decoding efficiency and lowering the requirement on bandwidth of the video decoding system.

According to one aspect of the present disclosure, a data caching method for a video decoder is provided. The method includes: receiving a data request from the video decoder, wherein the data request is for requesting one or more reference pixel blocks to decode a present pixel block, and the data request contains one or more reference motion vectors each corresponding to a reference pixel block; determining, for each reference motion vector in the data request, whether the reference pixel block corresponding to the reference motion vector has been cached in a cache memory which caches a plurality of reference pixel blocks; and if the reference pixel block corresponding to the reference motion vector has not been cached in the cache memory: A) determining an expected usage number and a historical usage condition for each reference pixel block which has been cached in the cache memory, wherein the expected usage number indicates how many times the cached reference pixel block will be used in decoding of a predetermined number of subsequent pixel blocks after the present pixel block, and the historical usage condition indicates a least recently used record of the cached reference pixel block; and B) selecting and deleting one of the cached reference pixel blocks according to the expected usage numbers and historical usage conditions of the cached reference pixel blocks, caching a reference pixel block corresponding to the reference motion vector from an external memory into the cache memory, and providing the reference pixel block to the video decoder.

According to another aspect of the present disclosure, a data caching apparatus for a video decoder is provided. The apparatus includes: a cache memory configured to cache a plurality of reference pixel blocks; a cache usage recorder configured to record historical usage condition for the plurality of reference pixel blocks cached in the cache memory, wherein the historical usage condition indicates a least recently used record of a cached reference pixel block; a cache controller configured to receive a data request from the video decoder, wherein the data request is for requesting one or more reference pixel blocks to decode a present pixel block, and the data request contains one or more reference motion vectors each corresponding to a reference pixel block; and a block usage number counter configured to obtain data requests for decoding a predetermined number of subsequent pixel blocks after the present pixel block, and determine an expected usage number for each of the reference pixel blocks cached in the cache memory based on the data requests, wherein the expected usage number indicates how many times the corresponding cached reference pixel block will be used in decoding of the predetermined number of subsequent pixel blocks; and wherein the cache controller is further configured to: if a reference pixel block corresponding to the reference motion vector used for decoding the present pixel block has not been cached in the cache memory, select and delete one of the cached reference pixel blocks according to the expected usage numbers and historical usage conditions of the cached reference pixel blocks, cache a reference pixel block corresponding to the reference motion vector from an external memory into the cache memory based on the reference motion vector, and provide the corresponding reference pixel block to the video decoder.

The foregoing has outlined, rather broadly, features of the present disclosure. Additional features of the present disclosure will be described, hereinafter, which form the subject of the claims of the present disclosure. It should be appreciated by those skilled in the art that the conception and specific embodiments disclosed herein may be readily utilized as a basis for modifying or designing other structures or processes for carrying out the objectives of the present disclosure. It should also be realized by those skilled in the art that such equivalent constructions do not depart from the spirit and scope of the present disclosure as set forth in the appended claims.

BRIEF DESCRIPTION OF THE DRAWINGS

The aforementioned features and other features of the present disclosure will be further described in the following

DETAILED DESCRIPTION OF THE PREFERRED EMBODIMENTS

The following detailed description refers to the accompanying drawings as a part of the present disclosure. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the disclosure. It should be understood that, the various aspects of the disclosure described and graphically presented herein may be arranged, replaced, combined, divided and designed in many different configurations, and these different configurations are implicitly included in the disclosure.

Figure 1:
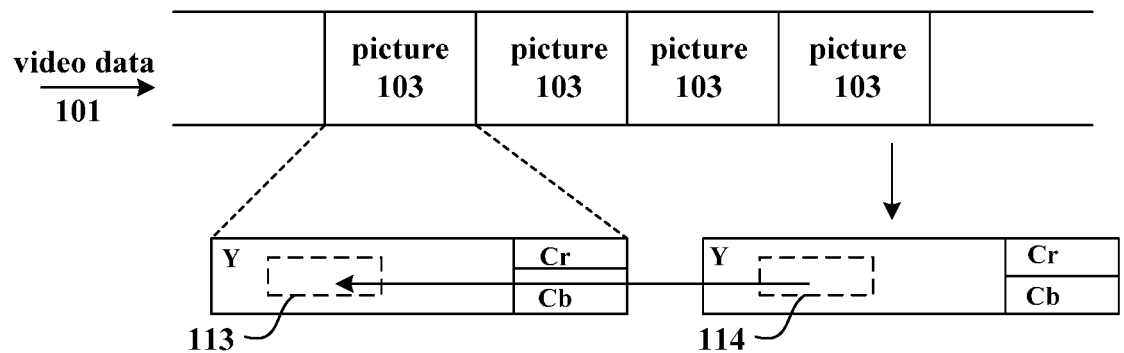
FIG. 1 illustrates an encoding process on video data according to an embodiment of the present disclosure.

FIG. 1 shows a process for encoding video data according to an embodiment of the present application. A standard and protocol relevant to the Moving Picture Experts Group (MPEG) is used in the encoding process.

As shown in FIG. 1, the video data 101 includes a group of pictures 103. Each picture of the group of pictures 103 includes two-dimensional grids of luminance Y, chrominance red Cr and chrominance blue Cb. It could be understood that, in other embodiments, other picture formats may be used for the pictures 103 of the video data 101, such as RGB format, which includes two-dimensional grids of color red R, color green G and color blue B.

In some embodiments, a motion compensation algorithm may be used in compressing the video data 101. The reason for using the motion compensation algorithm is that adjacent pictures 103 in the same group of pictures 103 may have similar content, which contain temporal redundancy, such that differences between the adjacent pictures can be encoded to reduce data required for representing the video data 101. Correspondingly, in a decoding (decompressing) process, motion vectors obtained in the encoding process may be used to perform the motion compensation, so as to reconstruct or predict a picture using the previously decoded pictures.

Specifically, the two-dimensional grids of luminance Y, chrominance red Cr and chrominance blue Cb of a picture may be divided into a plurality of pixel blocks. A pixel block 113 of the picture to be predicted may be compared with different parts of other reference pictures (decoded pictures). When a part of a reference picture has been determined, this part may be used as a reference pixel block 114, and a difference between the pixel block 113 of the picture to be predicted and the reference pixel block 114 may be encoded.

Figure 5:
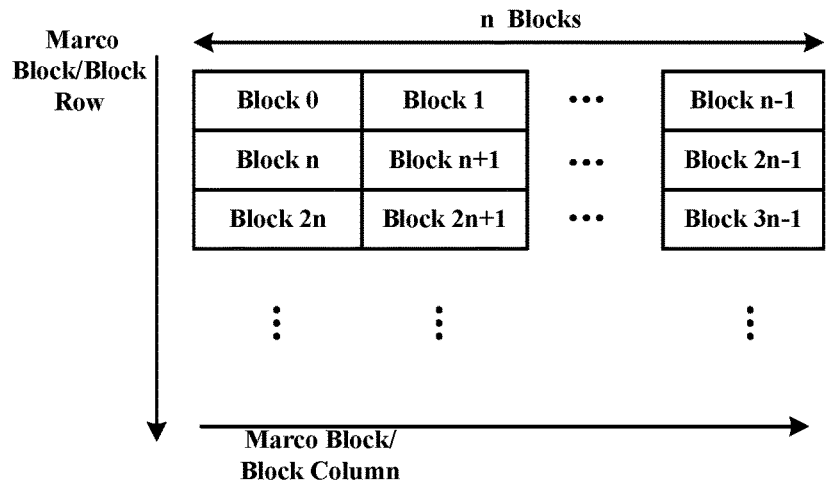
FIG. 5 illustrates a plurality of memory blocks of a memory storing a plurality of pixel blocks of a picture.

In actual practice, the pixel block 113 and the reference pixel block 114 are generally stored in format of macro block. Specifically, referring to FIG. 5, a plurality of memory tiles of a memory for storing pixel blocks of a picture are illustrated, wherein each memory tile is used to store a macro block having a plurality of pixel blocks. Specifically, the memory tile 0 corresponds to a first macro block in the first row of the picture, and the memory tile 1 corresponds to a macro block in the first row and at the right of the first macro block. A width of the picture is n macro blocks, thus the memory tile n−1 corresponds to the last macro block in the first row of the picture. Similarly, the macro blocks in the second row of the picture is stored in the memory tile n to (2n−1), the macro blocks in the third row of the picture is stored in the memory tile 2n to (3n−1), and so on.

The position of a reference pixel block in a reference picture can be represented by a motion vector, which can further be used to determine a spatial displacement relation between the pixel block 113 and the reference pixel block 114. In some embodiments, each pixel block may include, for example, a 16*16 pixel array, two 16*8 pixel arrays, four 8*8 pixel arrays or sixteen 4*4 pixel arrays. In the case that the pictures are represented by pixel blocks, each picture may include a plurality of pixel blocks 113, and each pixel block 113 may be represented by a plurality of reference pixel blocks 114 and corresponding motion vectors. In addition, according to whether other reference pictures are required in reconstruction of a picture, the group of pictures 103 can be divided into intra-coded pictures (I picture), predictive-coded pictures (P picture) and bi-directionally-Predictive-coded pictures (B picture). Wherein, the intra-coded picture can be encoded using only information from itself, without reference to other pictures. The predictive-coded picture can be encoded with reference to pictures displayed before the predictive-coded picture, and the bi-directionally-predictive-coded picture can be coded with reference to both pictures displayed before the bi-directionally-predictive-coded picture and pictures displayed after the bi-directionally-predictive-coded picture.

Figure 2:
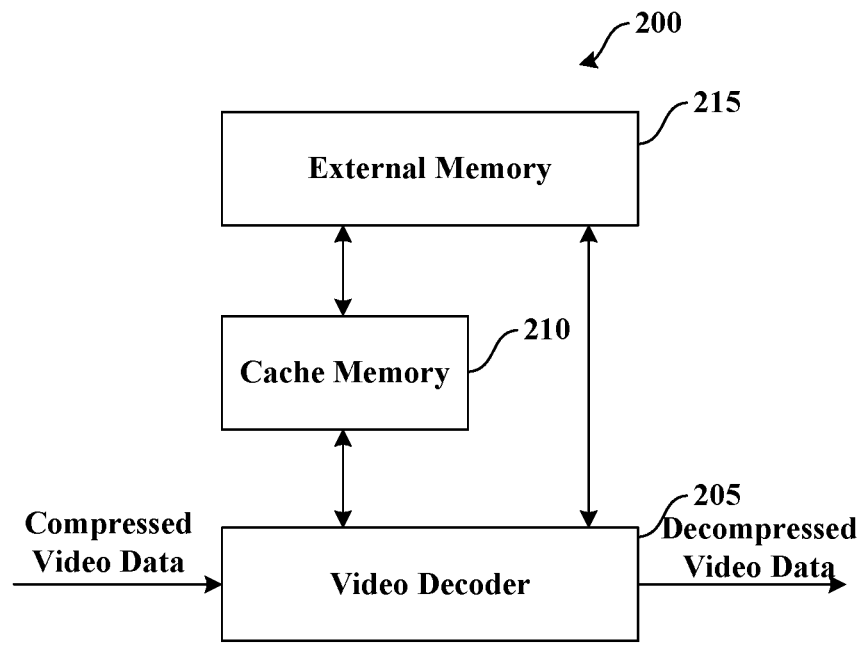
FIG. 2 illustrates a block diagram of a video decoding system 200 according to an embodiment of the present disclosure.

FIG. 2 illustrates a block diagram of a video decoding system 200 according to an embodiment of the present disclosure.

As shown in FIG. 2, the video decoding system 200 includes a video decoder 205, a cache memory 210 and an external memory 215. Specifically, the video decoder 205 receives compressed video data, and decompresses it to generate decompressed video data. The video decoder 205 performs the decompressing process picture by picture. After a reference picture is decompressed, the video decoder 205 stores the reference picture into the external memory 215. The picture to be predicted is divided into a plurality of pixel blocks, wherein each pixel block can be predicted and obtained according to one or more reference pixel blocks in one or more reference pictures. In order to decompress the picture to be predicted, the video decoder 205 sends a data request to obtain reference pixel blocks needed in the decompressing process. A portion of the reference pixel blocks may be cached in the cache memory 210, while the other reference pixel blocks may be stored in the external memory 215. The video decoder 205 may first check the cache memory 210 to determine whether the requested reference pixel blocks are cached therein. If yes, the video decoder 205 reads the reference pixel blocks from the cached memory 210; and if no, the video decoder 205 further accesses the external memory 215, reads the reference pixel blocks needed, and caches them in the cache memory 210. Moreover, the reference pixel blocks which are read out are also provided to the video decoder 205.

In some embodiments, the cache memory 210 may include a plurality of cache units, wherein each cache unit stores a reference pixel block. Each cache unit may use the reference motion vector of the reference pixel block cached therein as a cache tag. In addition, the data request includes one or more reference motion vectors, and each reference motion vector corresponds to a requested reference pixel block. In this way, when checking whether the requested reference pixel blocks are cached in the cached memory 210, the reference motion vectors in the data request may be compared with the reference motion vectors which are used cache tags. If they matched with each other, then it may be determined that the requested reference pixel blocks have been cached; otherwise, it may be determined that the requested reference pixel blocks haven't been cached.

Figure 3:
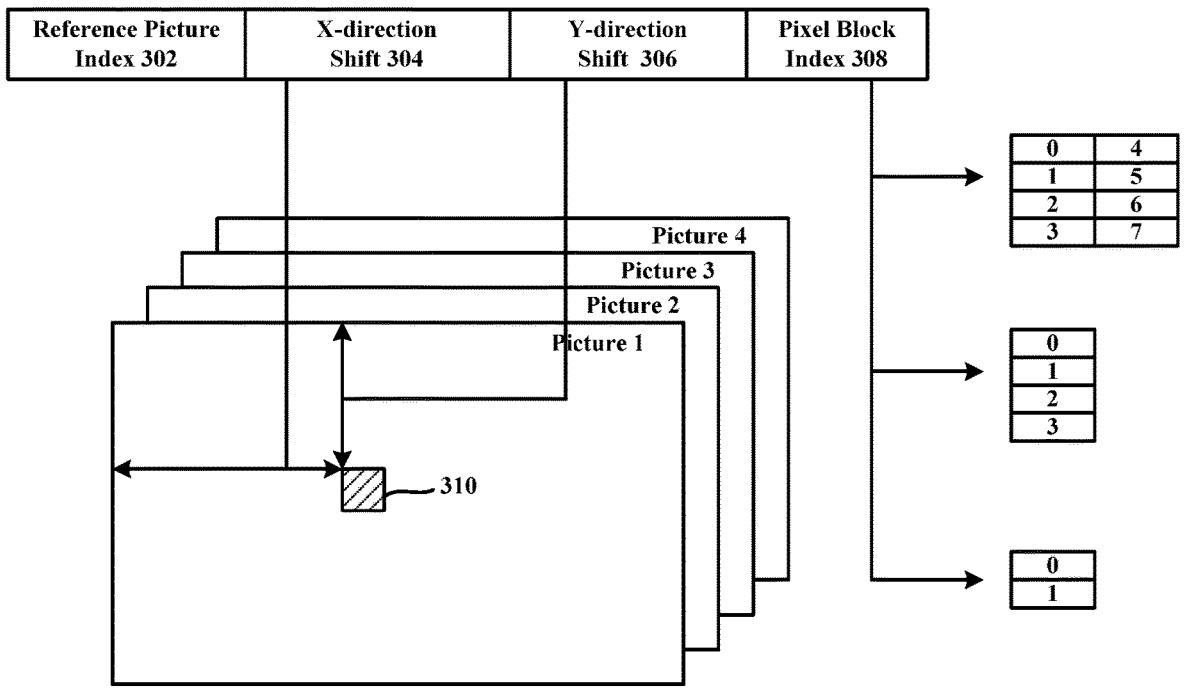
FIG. 3 illustrates a reference motion vector 300 which can be used as a cache tag according to an embodiment of the present disclosure.

FIG. 3 illustrates a reference motion vector 300 which can be used as a cache tag according to an embodiment of the present disclosure.

As shown in FIG. 3, the reference motion vector 300 illustrates an exemplary address format, which can be used by a control logic of the cache memory to request a reference pixel block. The reference motion vector 300 may be stored as a cache tag, and correspond to a cache unit in the cache memory. In some embodiments, the reference motion vector 300 includes a reference picture index 302, an X-direction shift 304, a Y-direction shift 306 and a pixel block index 308.

Specifically, the reference picture index 302 is used to represent a reference picture corresponding to the reference motion vector 300, that is, a reference picture that the reference pixel block belongs to. The X-direction shift 304 represents a horizontal shift of the macro block 310 which the reference pixel block belongs to with respect to an origin of the reference picture, and the Y-direction shift 304 represents a vertical shift of the macro block 310 which the reference pixel block belongs to with respect to the origin of the reference picture. In other words, the position of the macro block to be processed can be determined based on the X-direction shift 304 and the Y-direction shift 306. The pixel block index 308 represents the position of the reference pixel block in the macro block. It can be seen that, the reference motion vector 300 in FIG. 3 can uniquely identify a reference pixel block.

Figure 4:
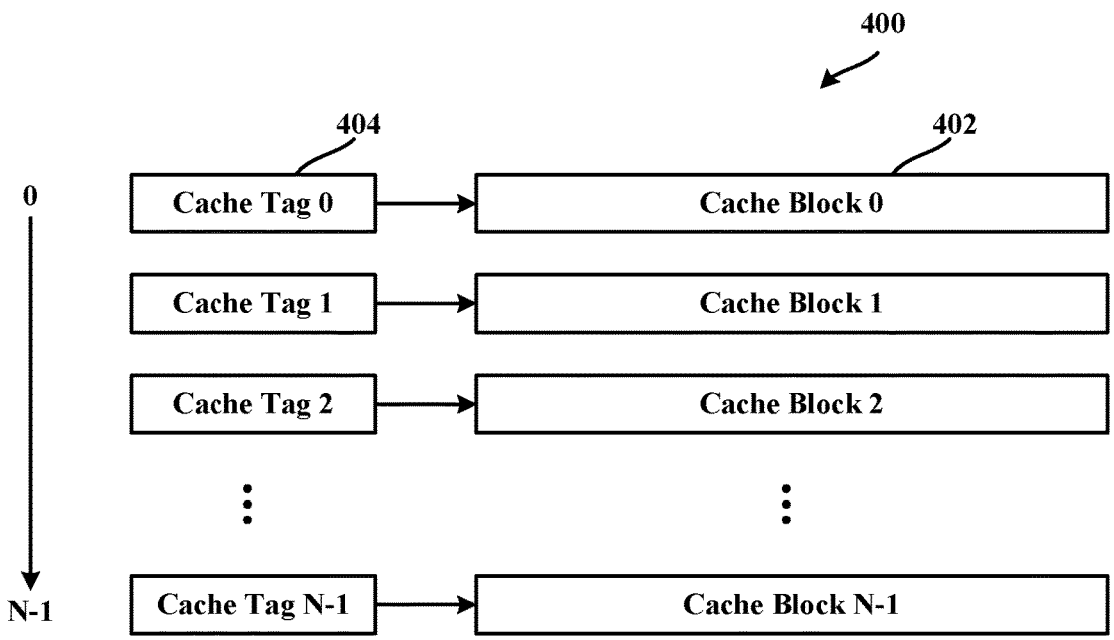
FIG. 4 illustrates a cache memory 400 according to an embodiment of the present disclosure.

FIG. 4 illustrates a structure diagram of a cache memory 400 according to an embodiment of the present disclosure.

As shown in FIG. 4, the cache memory 400 includes N cache units 402 indexed from 0 to N−1, which are used to cache the reference pixel blocks obtained from the external memory. In some embodiments, the cache memory 400 may be a full associative cache memory. That is, the reference pixel blocks can be cached in any one of available cache units 402 of the cache memory 400. The control logic of the cache memory may include N cache tags 404, which correspond to the N cache units 402 in a one to one manner. Thus, when checking whether the cache memory has cached reference pixel blocks required by the data request, it is only needed to check the cache tags 404.

Figure 6:
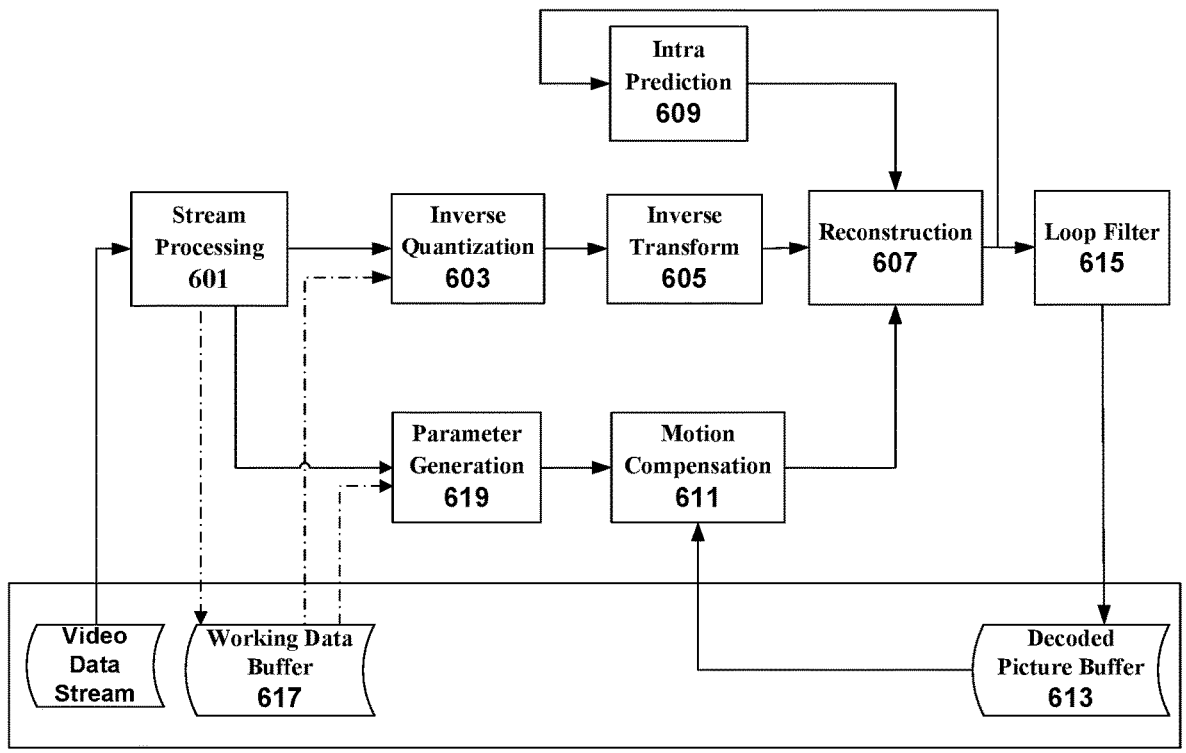
FIG. 6 illustrates a block diagram of a video decoder according to an embodiment of the present disclosure.

FIG. 6 illustrates a block diagram of a video decoder according to an embodiment of the present disclosure.

As shown in FIG. 6, the video decoder includes a stream processing module 601, which is used to receive an input video data stream, and decode the video data stream into a plurality of pixel blocks, so as to generate run-level, prediction, pixel block information, and so on. Then an inverse quantization module 603 and an inverse transform module 605 sequentially process the data output from the stream processing module 601, so as to recover the pixel blocks of differential pixel sample values. After that, a reconstruction module 607 receives the recovered pixel blocks of the differential pixel sample values, and combines them with the prediction pixel block output from an intra prediction module 609 or a motion compensation module 611, so as to complete the entire video decoding process. The video pictures produced by the decoding operation may be stored in a decoded picture buffer 613. In some embodiments, depending on the information in the video data stream, before stored in the decoded picture buffer 613, the video picture obtained by the decoding operation may be filtered by a loop filter 615. In addition, in some cases, for example, in a case that a decoupling architecture is used, the stream processing module 601 may vicariously write the obtained data into a working data buffer 617, and the inverse transform module 605 and a parameter generation module 619 read data from the working data buffer 617 for subsequent processing.

The parameter generation module 619 is used to generate motion vector information, and the motion compensation module 611 uses the motion vector information to obtain reference pixel blocks from the decoded picture buffer 613.

Figure 7:
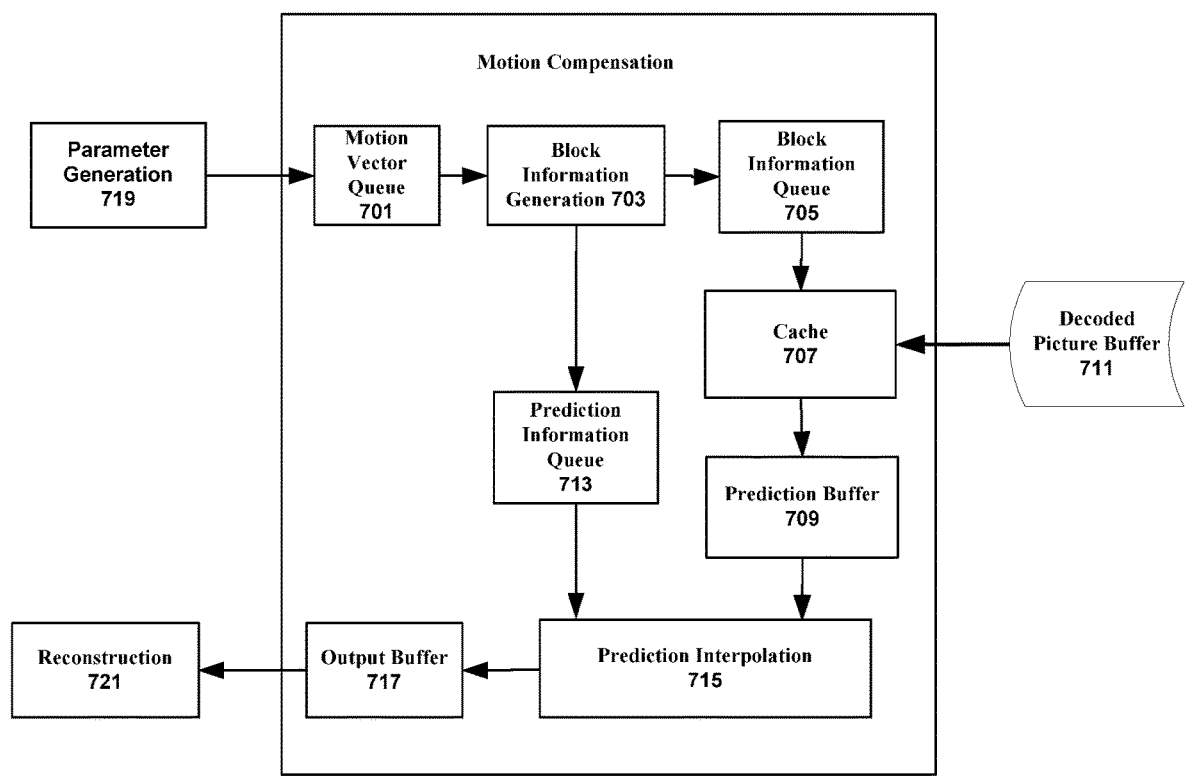
FIG. 7 illustrates an exemplary block diagram of the motion compensation module of the video decoder shown in FIG. 6.

FIG. 7 illustrates an exemplary block diagram of the motion compensation module shown in FIG. 6.

As shown in FIG. 7, the motion compensation module includes a motion vector queue 701. The motion vector queue 701 receives reference motion vector information from a parameter generation module 719 (the parameter generation module 619 shown in FIG. 3), and caches the received reference motion vector information. A pixel block information generation module 703 converts the reference motion vector information into reference pixel block information which is used to position the reference pixel block in the reference picture. Then the reference pixel block information is sent to a pixel block information queue 705.

The motion compensation module further includes a data cache memory 707, which corresponds to the video picture cache memory 210 in FIG. 2. According to the reference motion vector in the pixel block information queue 705, the data cache memory 707 is first searched to determine whether the required reference pixel block is stored therein. If the required reference pixel block is found, namely, if cache hit occurs, then the data cache memory 707 transmits the found reference pixel block to a prediction buffer 709. If the required reference pixel block is not found, namely, if a cache miss occurs, then the data cache memory 707 requests a corresponding reference pixel block from a decoded picture buffer 711 according to the reference motion vector. After receiving the reference pixel block, the cache memory 707 further transmits it to the prediction buffer 709.

The pixel block information generation module 703 also generates prediction information. The prediction information is generally a fractional part of the motion vector, and related to the generation of a pixel at a non-integer position of a pixel block. The prediction information is provided to a prediction information queue 713 from the pixel block information generation module 703, and then is provided to a prediction interpolation module 715 from the prediction information queue 713. The prediction interpolation module 715 also receives the reference pixel block from the prediction buffer 709, so as to calculate the prediction pixel block based on the reference pixel block and the prediction information. After the prediction pixel block is calculated, the prediction interpolation module 715 transmits the prediction pixel block to an output buffer 717, and then the output buffer 717 outputs the prediction pixel block to a reconstruction module 721 (the reconstruction module 607 in FIG. 6).

Generally, the cache memory used in a video decoder may be a read only cache. Hit rate is an important factor affecting the efficiency of the read only cache. The higher the hit rate is, the lower the bandwidth is needed for the decoding operation. Moreover, the cache pixel block replacement algorithm directly affects the hit rate of the cache.

The Least-Recently Used (LRU) algorithm is a commonly used cache data block replacement algorithm. The LRU algorithm records relative usage of each data block in the cache memory, and when cache miss occurs, the least recently used data block in the cache memory will be replaced by new data. The LRU algorithm is often used in the cache memory of a central processing unit (CPU), because it is difficult to predict which program will be executed by the CPU in the following period.

The inventors of the present disclosure find that, for video decoding applications, the usage of pixel blocks can be determined based on the motion vectors, that is, the usage of the pixel blocks can be predicted to some extent. For example, the reference motion vectors included in the motion vector queue may be analyzed, so as to count and analyze the reference pixel blocks required in the following period. Therefore, the historical usage and the expected usage of the pixel blocks in the cache memory can be combined together to determine a replacement strategy of the pixel blocks in the cache memory.

Figure 8:
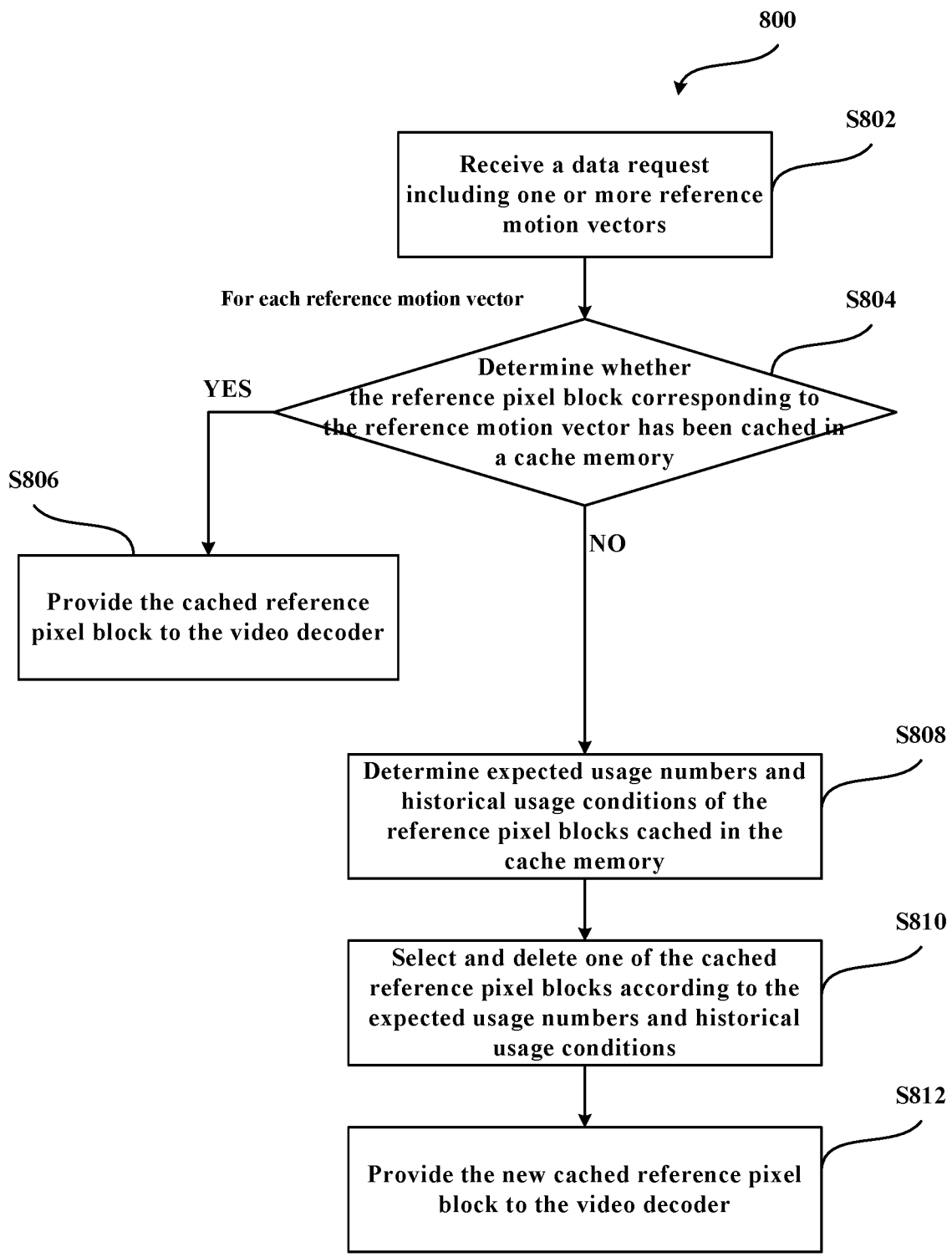
FIG. 8 illustrates a flow chart of a data caching method according to an embodiment of the present disclosure.

FIG. 8 illustrates a flow chart of a data caching method according to an embodiment of the present disclosure. The data caching method is used to reconstruct a pixel block in a video picture. In some embodiments, the data caching method may be applied in the video decoder systems shown in FIG. 2 and FIGS. 6-7, and serve as a portion of a video decoding method. The video decoding method may be used to decode video data, so as to reconstruct a corresponding video picture.

As shown in FIG. 8, in step S802, a data request transmitted from a video decoder is received, wherein the data request is used to request one or more reference pixel blocks to decode a present pixel block. The data request includes one or more reference motion vectors, and each reference motion vector corresponds to a reference pixel block.

Then, in step S804, for each reference motion vector in the data request, it is determined whether a reference pixel block corresponding to the reference motion vector has been cached in the cache memory. There may be a plurality of reference pixel blocks stored in the cache memory, as shown in the cache memory 400 in FIG. 4. The cache memory includes a plurality of cache blocks, wherein each cache block has a reference pixel block cached therein. These cached reference pixel blocks may be cached when reconstructing other pixel blocks before the present pixel block. As described above, the reference motion vectors corresponding to the cached reference pixel blocks can be used as cache tags and be stored in the cache memory as well. Therefore, in step S804, it can be determined whether the required reference pixel block has been cached in the cache memory by checking the reference motion vectors stored as the cache tags.

Based on the determination results in step S804, if the reference pixel block corresponding to the reference motion vector has been cached in the cache memory, then, in step S806, the reference pixel block may be provided to the video decoder, so that the reference pixel block can be used in the decoding operation of the present pixel block.

Otherwise, if the reference pixel block corresponding to the reference motion vector has not been cached in the cache memory, then, in step S808, an expected usage number and a historical usage condition of the reference pixel blocks which have been cached in the cache memory can be determined.

Figure 9:
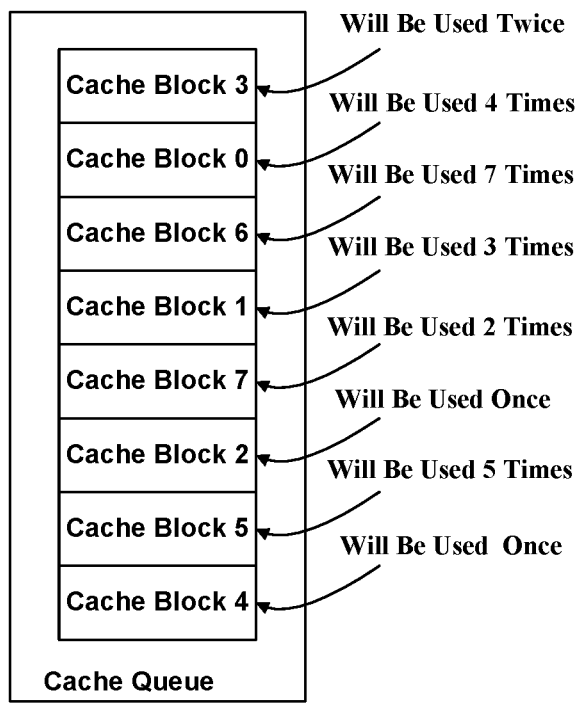
FIG. 9 illustrates a state of a cache queue in a cache memory according to an embodiment of the present disclosure.

Specifically, the expected usage number indicates how many times the cached reference pixel block will be used in decoding of a predetermined number of subsequent pixel blocks after the present pixel block. In some embodiments, the predetermined number may be 1, 2, 3, 5, 10 or more. In actual applications, data requests used in decoding of a predetermined number of subsequent pixel blocks can be obtained, and the expected usage number of each cached reference pixel block can be calculated based on the reference motion vectors included in the data requests. FIG. 9 illustrates a storage state of a cache queue in the cache memory according to an embodiment of the present disclosure. As shown in FIG. 9, the cache queue includes 8 cache blocks 0-7, wherein each cache block has a reference pixel block stored therein. In addition, the expected usage number of each reference pixel block has been counted and illustrated. For example, the reference pixel block cached in the cache block 3 will be used twice, and the reference pixel block cached in cache block 2 will be used once.

In another aspect, the historical usage condition indicates a LRU record of a reference pixel block cached in the cache memory. For example, as shown in FIG. 9, the cache queue is arranged according to the LRU algorithm, wherein the cache block 3 is the least-recently used cache block, and the cache block 4 is the most-recently used cache block.

Next, in step S810, one of the cached reference pixel blocks may be selected and deleted according to the expected usage numbers and the historical usage conditions of the cached reference pixel blocks, and a corresponding reference pixel block in the external memory will be cached in the cache memory based on the reference motion vector. At the same time, the reference motion vector corresponding to the newly cached reference pixel block may also be cached in the cache memory, so as to identify the reference pixel block.

Figure 10:
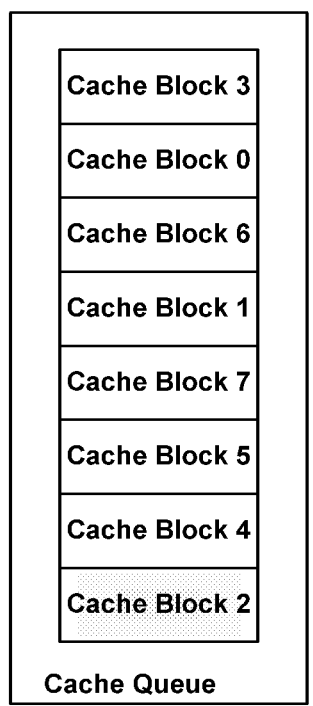
FIG. 10 illustrates a state of the cache queue shown in FIG. 9 after a cache unit 2 is selected and updated.

In some embodiments, the deleted reference pixel block may be the one having the least expected usage number. For example, in the example shown in FIG. 9, both of the reference pixel blocks stored in the cache blocks 2 and 4 will be used once. In some embodiments, one of the cache blocks 2 and 4 may be randomly selected, and the reference pixel block cached in the selected cache block will be deleted. In some embodiments, because the cache block 2 has a longer unused time than the cache block 4, the reference pixel block in the cache block 2 may be deleted. In other words, if there are more than one reference pixel blocks having the same least expected usage number, a reference pixel block which is not used for a longer time may be selected and deleted. FIG. 10 illustrates a storage state of the cache queue shown in FIG. 9 after the cache block 2 is selected and updated. As shown in FIG. 10, as the cache block 2 has been updated, the cache block 2 is now the most recently used cache block, and thus the cache block 2 is arranged at the most recently used entry of the cache queue. Correspondingly, the cache blocks 5 and 4 are updated and moved.

In actual applications, the counting and calculation of the expected usage number may be performed according to the order in the cache queue, for example, starting at the least-recently used entry and ending at the most-recently used entry. In this case, when it is determined that an expected usage number of a reference pixel block cached in a cache block is zero, then the calculation of the expected usage numbers of subsequent cache units may stop, because zero is the possible smallest expected usage number. Accordingly, the reference pixel block which is stored in the cache block having an expected usage number of zero may be deleted, and the cache block may be updated using a new reference pixel block obtained from external memory.

Figure 11:
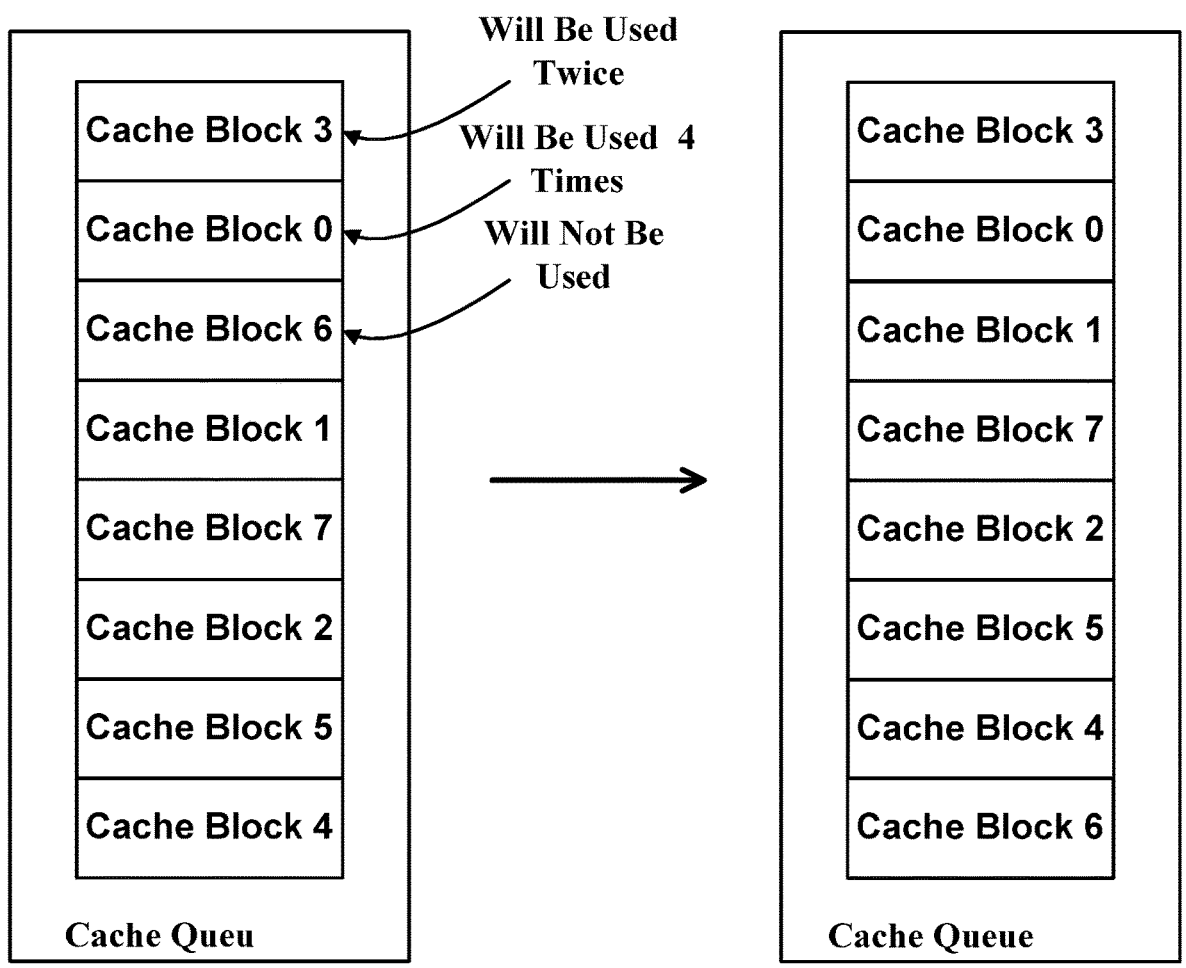
FIG. 11 illustrates data updating of a cache unit when an expected usage number of a reference video pixel block in the cache unit is zero.

FIG. 11 illustrates data updating of a cache block when the expected usage number of a reference pixel block in the cache block is zero. As shown in FIG. 11, the cache block 3 is at the least-recently used entry of the cache queue, the calculation and counting of expected usage numbers of reference pixel blocks stored in the cache blocks start at the cache block 3. After analysis, it is determined that the cache block 3 will be used for twice, and the cache block 0 will be used for 4 times but the cache block 6 will not be used. In this case, the cache block 6 is determined as the first cache block having an expected usage number of zero, and thus, even if there may be other cache blocks having an expected usage number of zero, the cache block 6 is still the cache block having a longer unused time compared with these cache blocks. Therefore, the reference pixel block cached in the cache block 6 may be selected and deleted, and then be updated accordingly. After updating, the cache block 6 is moved to the newly undated end of the cache queue, as shown in the cache queue of FIG. 11.

At the same time of or after step S810, in step 812, the reference pixel block cached in step S810 may be provided to the video decoder to reconstruct the video picture.

It can be seen that, for the data caching method described in the above embodiments, as the updating of the reference pixel block in the memory cache depends on the expected usage number and the historical usage condition, data hit rate of the cache memory is higher than the conventional technology. Therefore, the speed and efficiency of video decoding is improved, and the requirement on the system bandwidth of video decoding can be reduced.

Figure 12:
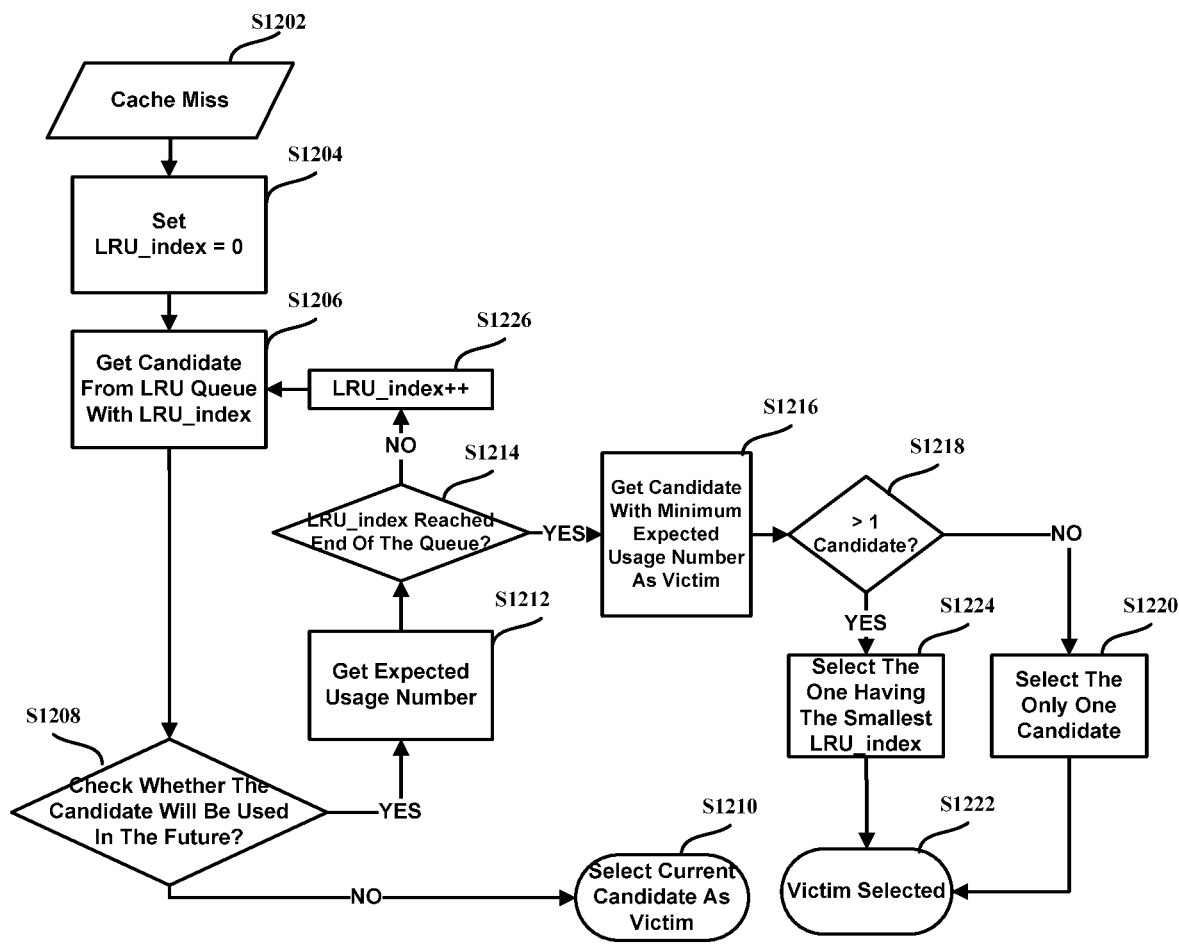
FIG. 12 illustrates a method for updating a cache block in the cache memory when cache miss occurs.

FIG. 12 illustrates an algorithm for updating a pixel block in a cache memory when pixel block miss occurs. The algorithm can be used to implement the method shown in FIG. 8.

As shown in FIG. 12, the algorithm starts at step S1202, and after comparison, it is determined that the reference pixel block is not cached in the cache memory. The pixel block usage history queue is cached in the cache memory according to the LRU algorithm, and thus it is called a LRU queue. In this case, in step S1204, a parameter LRU_index is set to be 0, such that the processing of the pixel blocks starts at the head of the LRU queue, wherein the parameter LRU_index represents a sequence number of a present pixel block in the LRU queue. Then, in step S1206, a pixel block indicated by the parameter LRU_index is obtained from the LRU queue. Next, in step S1208, a reference motion vector corresponding to the obtained pixel block is checked to determine whether the pixel block would be used within certain time period. If the pixel block will not be used, in step S1210, a new reference pixel block is obtained from an external memory to update the cache block which stores the pixel block. Otherwise, if it is determined in step S1208 that the pixel block will be used, in step S1212, an expected usage number of the pixel block is obtained. Next, in step S1214, it is determined whether the pixel block indicated by LRU_index is at the end of the LRU queue, so as to determine whether all pixel blocks in the LRU queue have been processed. If the pixel block is at the end of the LRU queue, in step S1216, a pixel block having a least expected usage number is obtained. Next, in step S1218, it is determined whether the number of the pixel blocks having the least expected usage number is greater than one. If the number of the pixel blocks having the least expected usage number is one, in step S1220, the pixel block having the least expected usage number is selected, and in step S1222, a new pixel block is used to update the cache block storing the selected pixel block. Otherwise, if the number of the pixel blocks having the least expected usage number is greater than one, in step S1224, a pixel block having a smallest LRU_index is selected from the more than one pixel blocks having the least expected usage number, and in step S1222, a new pixel block is used to update the cache block storing the selected pixel block. In another aspect, if it is determined that the pixel block indicated by LRU_index is not at the end of the LRU queue in step S1214, then in step S1226, the parameter LRU_index adds 1, and step S1206 is performed again, so as to obtain a pixel block indicated by an updated LRU_index from the LRU queue. After that, a similar process as described above may be performed on the pixel blocks. After several cycles of processing, the pixel blocks in the cache memory may be updated.

Figure 13:
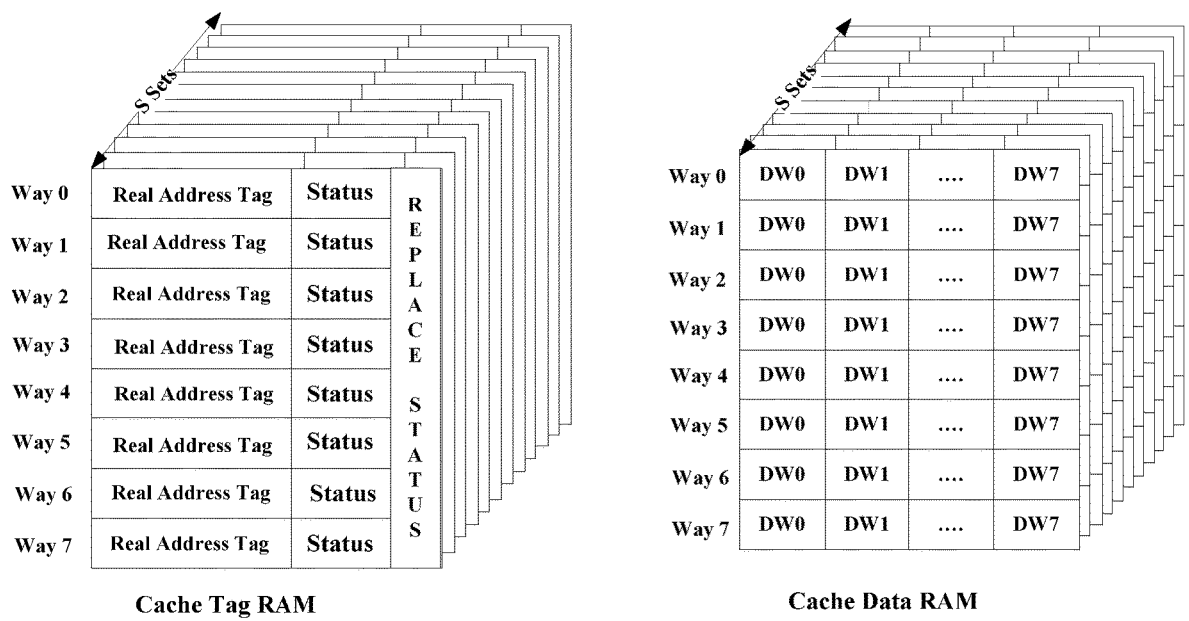
FIG. 13 illustrates a structural diagram of a cache memory having an Eight-Way Set-Associative structure.

In actual applications, the data caching method according to the present disclosure may be applied in a cache memory having a Multi-Way Set-Associative structure. FIG. 13 illustrates a structural diagram of a cache memory having the Multi-Way Set-Associative structure, wherein the cache memory is composed of S sets, and each set is divided into eight ways. The cache memory includes a cache tag RAM and a cache data RAM, and may be a cache status RAM or cache status registers, wherein these RAMs are interrelated with each other.

Figure 14:
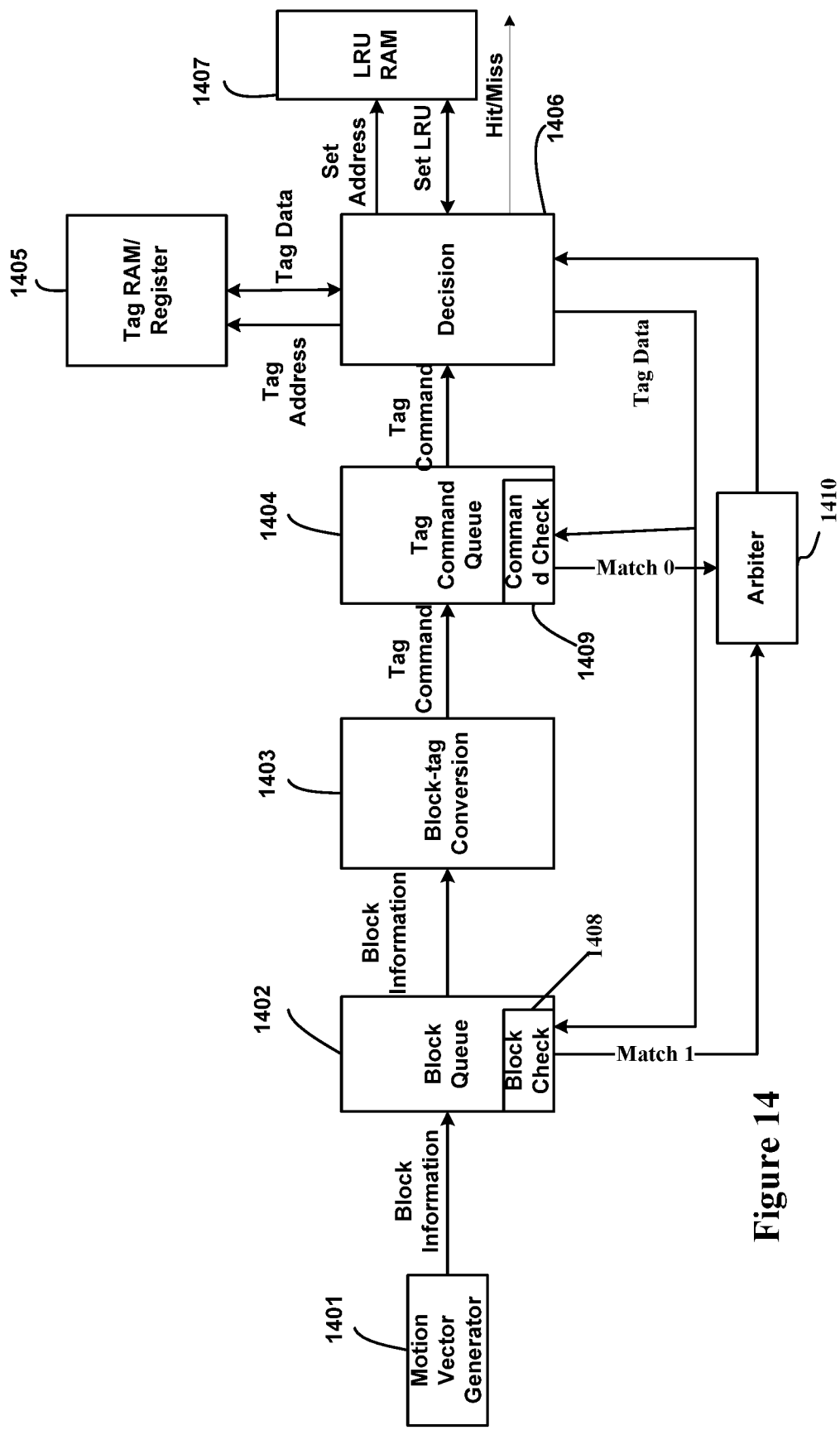
FIG. 14 illustrates a block diagram of a circuit for updating pixel blocks in a cache memory according to cache tags.

FIG. 14 illustrates a block diagram of a circuit for updating cache blocks of a cache memory according to the cache tags.

As shown in FIG. 14, a motion vector generator 1401 is used to generate pixel block information. In some embodiments, the pixel block information may include the following information: a picture index of the reference picture, an integral part of the motion vector in the horizontal direction (represented by coordinate_x), an integral part of the motion vector in the vertical direction (represented by coordinate_y), a width and a height of the reference pixel block.

Figure 15:
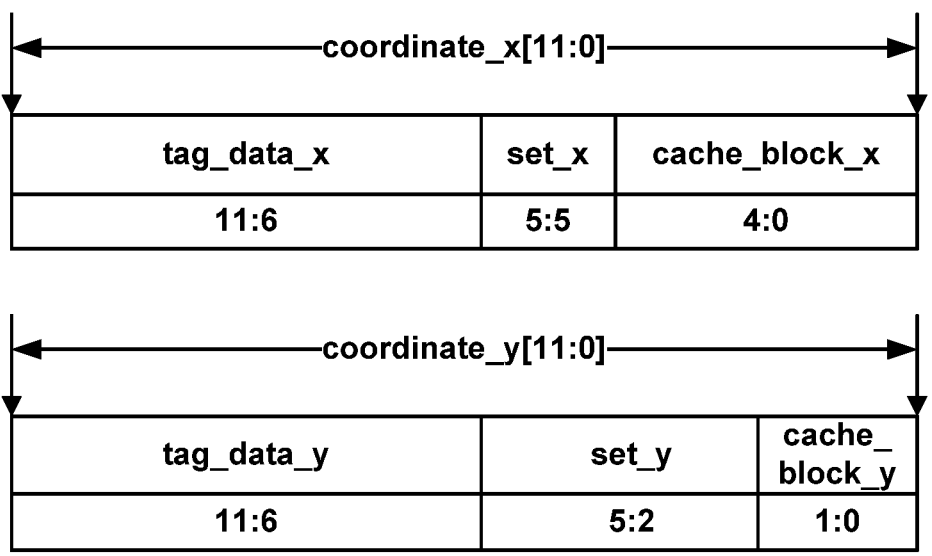
FIG. 15 illustrates data structures of data coordinate_x and data coordinate_y.

FIG. 15 illustrates data structures of data coordinate_x and data coordinate_y. As shown in FIG. 15, coordinate_x includes tag_data_x, set_x and cache_block_x, and coordinate_y includes tag_data_y, set_y and cache_block_y.

In the cache memory, tag_data_x and the tag_data_y are a portion of the actual address tag, wherein tag_data_x is higher bits of the horizontal coordinate of the reference pixel block, and the tag_data_y is higher bits of the vertical coordinate of the reference pixel block. set_x and set_y are address indexes in the coordinates for addressing and determining a certain set in the S set. cache_block_x and cache_block_y represent internal coordinates of the reference pixel block in a way, and the bits occupied by cache_block_x and cache_block_y are determined by the size of the cache block. For example, for a 32*4 cache block, cache_block_x occupies 5 bits, and cache_block_y occupies 2 bits.

Referring to FIG. 14, a pixel block information queue 1402 stores the pixel block information generated by the motion vector generator 1401, and provides it to a pixel block-tag command conversion module 1403. The pixel block-tag command conversion module 1403 converts the pixel block information into one or more tag commands (TagCmd), and then stores the one or more tag commands in a tag command queue 1404. The tag command may include the following information: an index of the reference picture, tag_data_x, set_x, tag_data_y and set_y.

The tag RAM/register 1405 illustrated in FIG. 14 is a tag memory implemented by RAM or registers, and stores tags corresponding to data cached in the cache memory. The LRU RAM 1407 is used to store LRU queues corresponding to each group. The block checking unit 1408 is used to check whether there is a pixel block in the pixel block queue matching with a specified tag data, and each pixel block can be converted into one or more tag commands. When the pixel block is converted into only one tag command, it is determined after comparison whether tag_data_x,tag_data_y of the specified tag data is the same as tag_data_x, tag_data_y of the pixel block. When the pixel block is converted into a plurality of tag commands, tag_data_x, tag_data_y of the pixel block is a range, and a match occurs when tag_data_x, tag_data_y of the specified tag command falls within the range. If no match occurs, it indicates that the pixel block queue doesn't include the specified pixel block, and the pixel block queue should be updated. Otherwise, it is not required to update the pixel block queue. The command checking unit 1409 is used to determine whether there is a tag command in the tag command queue matching with specified tag data. If yes, it indicates that the matched tag command is expected to be used. The checking operation may be implemented with a comparator. The checking results obtained by the block checking unit 1408 and the command checking unit 1409 will be provided to an arbiter 1410. If there is a match, the arbiter 1410 may choose the least-matched way, or if there is a plurality of least-matched ways, the arbiter 1410 may choose the least recently used way.

A decision unit 1406 obtains the tag command from the tag command queue 1404, receives the way choice from the arbiter 1410, and performs a predetermined algorithm to generate a result of tag hit or miss, so as to perform pixel block update on the selected cache block of the cache data RAM (for the cache memory shown in FIG. 13, the cache block is the way).

Figure 16:
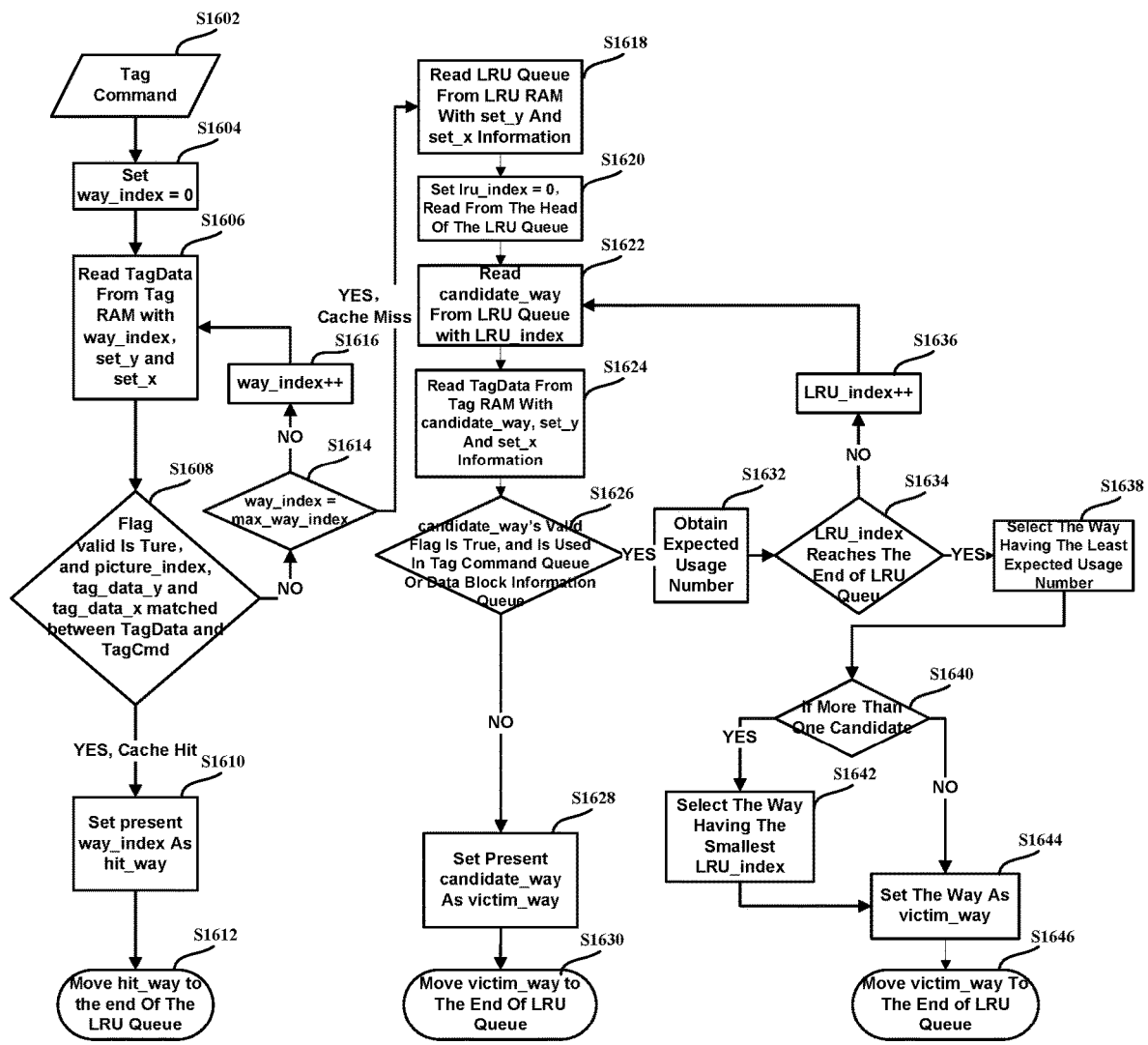
FIG. 16 illustrates a flow chart of how the circuit shown in FIG. 14 determines tag hit or miss according to the tag command and then updates the cache blocks.

FIG. 16 illustrates a flow chart of how the circuit of FIG. 14 determines tag hit or miss according to the tag command, and then performs the pixel block update.

As shown in FIG. 16, in step S1602, a tag command is received. Next, in step S1604, a parameter way_index is set to be 0, wherein the parameter way_index indicates the processed way in the tag RAM. Then, parameters set_y and set_x included in the tag command may be used to generate a read address of the tag RAM. For example, the read address may be {set_y, set_x, way_index}. Next, in step S1606, tag data (TagData) is read out from the tag RAM according to the read address, and a format of the tag data may be {picture_index, tag_data_y, tag_data_x, valid}. The parameter picture_index indicates an index of the reference picture, the parameter tag_data_y indicates higher bits of vertical coordinate of the reference pixel block, the parameter tag_data_x indicates higher bits of the horizontal coordinate of the reference pixel block, and the flag valid indicates whether the pixel block in the cache block is a valid pixel block, namely, whether a reference pixel block has been written into this cache block in previous operations.

In step S1608, if the tag valid is true, and other information such as picture_index, tag_data_y and tag_data_x, in TagData are all the same as the corresponding parameters picture_index, tag_data_y and tag_data_x in the tag command, it indicates that this way matches with the tag command. In other words, the pixel block corresponding to the tag command has been cached in the cache memory (i.e. cache hit). In this situation, it is not required to update the cache memory, and only the order of the LRU queues needs to be adjusted. Correspondingly, in step S1610, the present way_index is set to hit_way, that is, the hit way. Then, in step S1612, the hit_way is moved to the end of the LRU queue, which means that this way is the most recently used way.

Otherwise, if the checking result of step S1608 is NO, namely, at least one parameter of picture_index, tag_data_y and tag_data_x in TagDate is different from the corresponding parameters picture_index, tag_data_y and tag_data_x in the tag command, or the flag valid is false, then, in step S1614, it is determined whether way_index is equal to a parameter max_way_index. The parameter max_way_index indicates a maximum value of way_index. If way_index is not equal to the maximum value, then, in step S1616, way_index is increased by 1, that is, the next way is selected for subsequent processing. Then, step S1606 and subsequent steps are still performed on this way. After a number of such cycles, it can be determined whether the cache memory has cached the pixel block corresponding to TagCmd.

If it is determined in step S1614 way_index is equal to max_way_index but still no hit occurs, namely, if the pixel block corresponding to TagCmd is not stored in the cache memory, the data of the cache memory needs to be updated. Specifically, in step S1618, the LRU queue is read out from the LRU RAM (namely, the cache status RAM) according to information of set_y and set_x included in TagCmd, and the least recently used way is at the head of the LUR queue. Next, in step S1620, LRU_index is set to be 0 and data is read out from the head of the LRU queue. Next, in step S1622, a candidate way candidate_way is read out from the LRU queue according to LRU_index. In step S1624, TagData is read out from the tag RAM according to information of candidate_way, set_y and set_x.

Then, in step S1626, it is determined whether the flag valid of the data TagData is true. If the flag valid is false, then, in step 1628, the present candidate_way is set to the way to be updated, namely, victim_way. Then, in step S1630, the way to be updated is moved to the end of the LRU queue.

On the contrary, if it is determined in step S1626 that the flag valid of the data TagData, which has been read out, is true, then, in step S1626, the process continues to compare and determine whether the parameters of picture_index, tag_data_y and tag_data_x in TagData are the same as the corresponding parameters of picture_index, tag_data_y and tag_data_x in each tag command of the tag command queue, and whether the parameters of picture_index, tag_data_y and tag_data_x in TagData are different from the corresponding parameters of picture_index, tag_data_y and tag_data_x of the pixel block information in the pixel block information queue, so as to determine whether there is a matching tag command or pixel block information. If it is determined in step S1626 that there is no matching tag command or pixel block information, then, step S1628 is performed. On the contrary, if it is determined in step S1626 that there is a matching tag command or pixel block information, then, in step S1632, an expected usage number corresponding to this way is obtained. Then, in step S1634, it is determined whether LRU_index reaches the end of LRU queue. If it is determined that LRU_index hasn't reached the end of the LRU queue, then, in step S1636, LRU_index is increased by 1, that is, the next way will be processed and step S1622 and subsequent steps will be performed.

On the contrary, if it is determined in step S1634 that the end of the LRU queue has arrived, then, in step S1638, the way having the least expected usage number is selected. Then, in step S1640, it is determined whether there is more than one way having the least expected usage number. If there is more than one way having the least expected usage number, then, in step S1642, the way having the smallest LRU_index is selected, and in step S1644, the way having the least expected usage number and the smallest LRU_index is set to the way to be updated (victim_way). Then, the way to be updated victim_way is moved to the end of the LRU queue. If it is determined that there is only one way having the least expected usage number in step 1640, then, in step S1644, this way is set to the way to be updated victim_way. Then, in step S1646, the way to be updated victim_way is moved to the end of the LRU queue.

It can be seen that, by performing above steps, when the cache memory doesn't have the required reference pixel block, the reference pixel block required to be updated can be selected based on the expected usage numbers and historical usage conditions of the reference pixel blocks cached in the cache memory, and the efficiency of the cache memory is improved.

The processes, methods, circuits and/or data structures shown in FIGS. 12-16 merely exemplify that the method and apparatus of the present application may be implemented in certain detailed manners, but the present application is not limited thereto.

Figure 17:
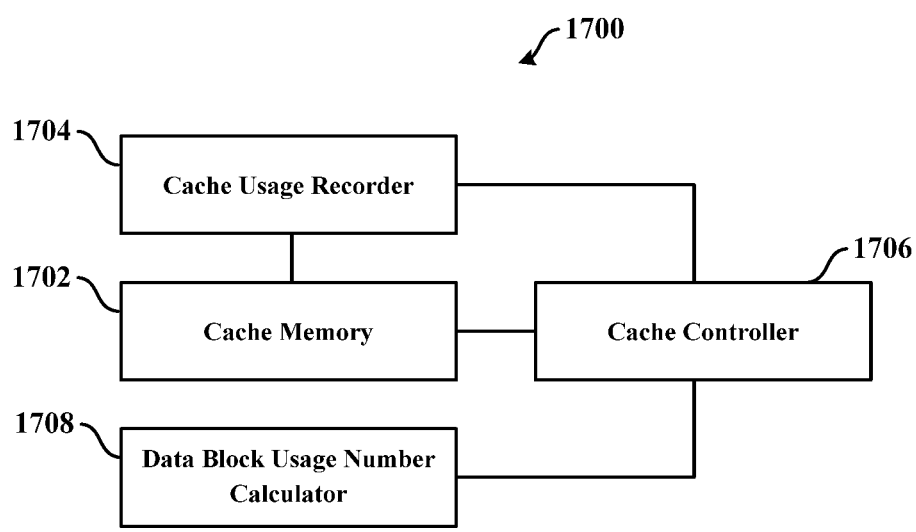
FIG. 17 illustrates a data caching apparatus according to an embodiment of the present disclosure.

FIG. 17 illustrates an apparatus 1700 for caching data in a video decoder according to an embodiment of the present disclosure. In some embodiments, the apparatus for caching data can be used in the video decoding systems and their components shown in FIG. 2, FIG. 6 and FIG. 7.

As shown in FIG. 17, the data caching apparatus 1700 includes:

a cache memory 1702 configured to cache a plurality of reference pixel blocks;

a cache usage recorder 1704 configured to record historical usage conditions for the plurality of reference pixel blocks cached in the cache memory 1702, wherein the historical usage condition indicates a least recently used record of a cached reference pixel block;

a cache controller 1706 configured to receive a data request from the video decoder, wherein the data request is for requesting one or more reference pixel blocks to decode a present pixel block, and the data request contains one or more reference motion vectors each corresponding to a reference pixel block; and a pixel block usage number counter 1708 configured to obtain data requests for decoding a predetermined number of subsequent pixel blocks after the present pixel block, and determine an expected usage number for each of the reference pixel blocks cached in the cache memory based on the data requests, wherein the expected usage number indicates how many times the corresponding cached reference pixel block will be used in decoding of the predetermined number of subsequent pixel blocks, wherein the cache controller 1708 is further configured to: if a reference pixel block corresponding to the reference motion vector used for decoding the present pixel block has not been cached in the cache memory, select and delete one of the cached reference pixel blocks according to the expected usage numbers and historical usage conditions of the cached reference pixel blocks, cache a reference pixel block corresponding to the reference motion vector from an external memory into the cache memory based on the reference motion vector, and provide the corresponding reference pixel block to the video decoder.

In some embodiments, the cache controller 1706 is further configured to select and delete a reference pixel block having a least expected usage number from the cache memory, if a reference pixel block corresponding to the reference motion vector for decoding the present pixel block is not cached in the cache memory.

In some embodiments, the cache controller 1706 is further configured to: if a reference pixel block corresponding to the reference motion vector for decoding the present pixel block is not cached in the cache memory, and if there are multiple reference pixel blocks having the same least expected usage number, select and delete one of the multiple reference pixel blocks which is less recently used.

In some embodiments, the cache controller 1706 is further configured to: if a reference pixel block corresponding to the reference motion vector for decoding the present pixel block is not cached in the cache memory, select and delete a reference pixel block which has an expected usage number of zero and is less recently used.

In some embodiments, the cache controller 1706 is further configured to: if the reference pixel block corresponding to the reference motion vector has been cached in the cache memory, provide the reference pixel block to the video decoder.

In some embodiments, the cache memory 1702 includes a plurality of cache units, the cached reference pixel blocks are cached in the plurality of cache units of the cache memory, and each cache unit uses the reference motion vector of the reference pixel block cached therein as a cache tag.

In some embodiments, the reference pixel blocks are decoded pixel blocks.

The operation of the data caching apparatus 1700 may refer to the description of the above data caching method, and is not described in detail herein.

Those skilled in the art may understand and implement other variations to the disclosed embodiments from a study of the drawings, the disclosure, and the appended claims. The above embodiments are presented by way of example only, and not limitation. The embodiments of the disclosure may be implemented in the form of hardware, software, or a combination thereof. Any modification, equivalent substitution, and improvement without departing from the spirit and principle of this invention should be covered in the protection scope of the invention. In the claims, the word "comprising" does not exclude other elements or steps, and the indefinite article "a" or "an" does not exclude a plurality. In disclosures according to present disclosure, one element may perform functions of several technical feature recited in claims. Any reference signs in the claims should not be construed as limiting the scope. The scope and spirit of the present disclosure is defined by the appended claims.

What is claimed is:

1. A data caching method for a video decoder, comprising the steps of:
    receiving a data request from the video decoder, wherein the data request is for requesting one or more reference pixel blocks to decode a present pixel block, and the data request contains one or more reference motion vectors each corresponding to a reference pixel block;
    determining, for each reference motion vector in the data request, whether the reference pixel block corresponding to the reference motion vector has been cached in a cache memory which caches a plurality of reference pixel blocks; and
    responsive to a determination that the reference pixel block corresponding to the reference motion vector has not been cached in the cache memory, performing the following steps:
    A) determining an expected usage number and a historical usage condition for each reference pixel block which has been cached in the cache memory, wherein the expected usage number indicates how many times the cached reference pixel block will be used in decoding of a predetermined number of subsequent pixel blocks after the present pixel block, and the historical usage condition indicates a least recently used record of the cached reference pixel block and relative usage time of each pixel block cached in the cache memory; and
    B) selecting and deleting one of the cached reference pixel blocks according to the expected usage numbers and historical usage conditions of the cached reference pixel blocks, caching a reference pixel block corresponding to the reference motion vector from an external memory into the cache memory, and providing the reference pixel block to the video decoder;
    wherein step B further comprises:
    responsive to a determination of a first reference pixel block having an expected usage number of zero among the cached reference pixel blocks which are ordered according to the historical usage condition of the cached reference pixel blocks, selecting and deleting the first reference pixel block;
    responsive to a determination that none of the reference pixel blocks have an expected usage number of zero and there are multiple reference pixel blocks having the same least expected usage number, selecting and deleting one of the multiple reference pixel blocks which is less recently used; and
    responsive to a determination that none of the reference pixel blocks have an expected usage number of zero and there are no multiple reference pixel blocks having the same least expected usage number, selecting and deleting a reference pixel block having a least expected usage number.

2. The method of claim 1, wherein step A further comprises:
    obtaining data requests for decoding the predetermined number of subsequent pixel blocks; and
    calculating the expected usage numbers of the cached reference pixel blocks based on reference motion vectors contained in the data requests.

3. The method of claim 1, further comprising:
    responsive to a determination that the reference pixel block corresponding to the reference motion vector has been cached in the cache memory, providing the reference pixel block to the video decoder.

4. The method of claim 1, wherein the cached reference pixel blocks are cached in respective cache units of the cache memory, and each cache unit uses the reference motion vector of the reference pixel block cached therein as a cache tag.

5. The method of claim 1, wherein each reference pixel block is a decoded pixel block.

6. A data caching apparatus for a video decoder, comprising:
    a cache memory configured to cache a plurality of reference pixel blocks;
    a cache usage recorder configured to record historical usage condition for the plurality of reference pixel blocks cached in the cache memory, wherein the historical usage condition indicates a least recently used record of a cached reference pixel block and relative usage time of each pixel block cached in the cache memory;
    a cache controller configured to receive a data request from the video decoder, wherein the data request is for requesting one or more reference pixel blocks to decode a present pixel block, and the data request contains one or more reference motion vectors each corresponding to a reference pixel block; and
    a block usage number counter configured to obtain data requests for decoding a predetermined number of subsequent pixel blocks after the present pixel block, and determine an expected usage number for each of the reference pixel blocks cached in the cache memory based on the data requests, wherein the expected usage number indicates how many times the corresponding cached reference pixel block will be used in decoding of the predetermined number of subsequent pixel blocks; and
    wherein the cache controller is further configured to: responsive to a determination that a reference pixel block corresponding to the reference motion vector used for decoding the present pixel block has not been cached in the cache memory, select and delete one of the cached reference pixel blocks according to the expected usage numbers and historical usage conditions of the cached reference pixel blocks, cache a reference pixel block corresponding to the reference motion vector from an external memory into the cache memory based on the reference motion vector, and provide the corresponding reference pixel block to the video decoder;
    wherein the cache controller is further configured to perform:
    responsive to a determination of a first reference pixel block having an expected usage number of zero among the cached reference pixel blocks which are ordered according to the historical usage condition of the cached reference pixel blocks, selecting and deleting the first reference pixel block;

responsive to a determination that none of the reference pixel blocks have an expected usage number of zero and there are multiple reference pixel blocks having the same least expected usage number, selecting and deleting one of the multiple reference pixel blocks which is less recently used; and responsive to a determination that none of the reference pixel blocks have an expected usage number of zero and there are no multiple reference pixel blocks having the same least expected usage number, selecting and deleting a reference pixel block having a least expected usage number.

7. The apparatus of claim 6, wherein the cache controller is further configured to: responsive to a determination that the reference pixel block corresponding to the reference motion vector has been cached in the cache memory, provide the reference pixel block to the video decoder.

8. The apparatus of claim 6, wherein the cache memory comprises a plurality of cache units, the cached reference pixel blocks are cached in the plurality of cache units of the cache memory, and each cache unit uses the reference motion vector of the reference pixel block cached therein as a cache tag.

9. The apparatus of claim 6, wherein each reference pixel block is a decoded pixel block.

10. A video decoding system, comprising
a video decoder, and
a data caching apparatus, wherein the data caching apparatus comprises:
a cache memory configured to cache a plurality of reference pixel blocks;
a cache usage recorder configured to record historical usage condition for the plurality of reference pixel blocks cached in the cache memory, wherein the historical usage condition indicates a least recently used record of a cached reference pixel block and relative usage time of each pixel block cached in the cache memory;
a cache controller configured to receive a data request from the video decoder, wherein the data request is for requesting one or more reference pixel blocks to decode a present pixel block, and the data request contains one or more reference motion vectors each corresponding to a reference pixel block; and
a block usage number counter configured to obtain data requests for decoding a predetermined number of subsequent pixel blocks after the present pixel block, and determine an expected usage number for each of the reference pixel blocks cached in the cache memory based on the data requests, wherein the expected usage number indicates how many times the corresponding cached reference pixel block will be used in decoding of the predetermined number of subsequent pixel blocks; and
wherein the cache controller is further configured to: responsive to a determination that a reference pixel block corresponding to the reference motion vector used for decoding the present pixel block has not been cached in the cache memory, select and delete one of the cached reference pixel blocks according to the expected usage numbers and historical usage conditions of the cached reference pixel blocks, cache a reference pixel block corresponding to the reference motion vector from an external memory into the cache memory based on the reference motion vector, and provide the corresponding reference pixel block to the video decoder;
wherein the cache controller is further configured to perform:
responsive to a determination of a first reference pixel block having an expected usage number of zero among the cached reference pixel blocks which are ordered according to the historical usage condition of the cached reference pixel blocks, selecting and deleting the first reference pixel block;
responsive to a determination that none of the reference pixel blocks have an expected usage number of zero and there are multiple reference pixel blocks having the same least expected usage number, selecting and deleting one of the multiple reference pixel blocks which is less recently used; and
responsive to a determination that none of the reference pixel blocks have an expected usage number of zero and there are no multiple reference pixel blocks having the same least expected usage number, selecting and deleting a reference pixel block having a least expected usage number.

* * * * *